United States Patent
Kovash et al.

(10) Patent No.: US 9,791,067 B2
(45) Date of Patent: Oct. 17, 2017

(54) FLARE TIP VALVE DAMPENING

(71) Applicant: Steffes Corporation, Dickinson, ND (US)

(72) Inventors: Dean A. Kovash, Dickinson, ND (US); Todd C. Mayer, Dickinson, ND (US)

(73) Assignee: Steffes Corporation, Dickinson, ND (US)

( * ) Notice: Subject to any disclaimer, the term of this patent is extended or adjusted under 35 U.S.C. 154(b) by 185 days.

(21) Appl. No.: 14/815,255

(22) Filed: Jul. 31, 2015

(65) Prior Publication Data

US 2016/0033054 A1    Feb. 4, 2016

Related U.S. Application Data

(60) Provisional application No. 62/031,209, filed on Jul. 31, 2014.

(51) Int. Cl.
*F16K 47/02* (2006.01)
*F23G 7/08* (2006.01)
*G05D 7/01* (2006.01)

(52) U.S. Cl.
CPC ............ *F16K 47/023* (2013.01); *F23G 7/085* (2013.01); *G05D 7/0153* (2013.01)

(58) Field of Classification Search
USPC ........................... 431/12; 137/505, 12, 116.5
See application file for complete search history.

(56) References Cited

U.S. PATENT DOCUMENTS

| | | | |
|---|---|---|---|
| 2,996,155 A * | 8/1961 | Priesemuth | H01H 50/88 137/857 |
| 3,833,337 A | 9/1974 | Desty et al. | |
| 3,840,328 A | 10/1974 | Ashton | |
| 4,021,189 A | 5/1977 | Swann et al. | |
| 4,099,908 A | 7/1978 | Beckmann et al. | |
| 5,307,834 A * | 5/1994 | Tatarek-Gintowt | G05D 16/10 137/116.5 |

(Continued)

FOREIGN PATENT DOCUMENTS

| CA | 2554138 A1 | 11/2007 |
|---|---|---|
| WO | 2014113529 A1 | 7/2014 |

OTHER PUBLICATIONS

Prosecution History, including the Application and Drawings of U.S. Appl. No. 11/438,078, filed May 18, 2006.

*Primary Examiner* — Avinash Savani
(74) *Attorney, Agent, or Firm* — Brian D. Kaul; Westman, Champlin & Koehler, P.A.

(57) ABSTRACT

A pressure relief valve includes a valve seat at the outlet, a valve body, and an air dashpot damper. In some embodiments, the valve body is configured to engage the valve seat and move along a central axis relative to the valve seat in response to a pressure at the outlet to regulate a flow of combustible gas through the outlet. In some embodiments, the air dashpot damper includes a tubular member having a closed distal end and an open proximal end, and a piston member received within the tubular member. In some embodiments, the tubular member or the piston member is attached to the valve body, and the piston moves relative to the tubular member along an axis of the tubular member in response to movement of the valve body relative to the valve seat. In some embodiments, the pressure relief valve includes a plurality of the air dashpot dampers.

18 Claims, 7 Drawing Sheets

(56) References Cited

U.S. PATENT DOCUMENTS

| | | | |
|---|---|---|---|
| 6,257,275 B1* | 7/2001 | Furbish | B63C 11/2209 137/505 |
| 2007/0281266 A1 | 12/2007 | Rajewski | |
| 2010/0206309 A1* | 8/2010 | Han | A61B 5/097 128/205.24 |

* cited by examiner

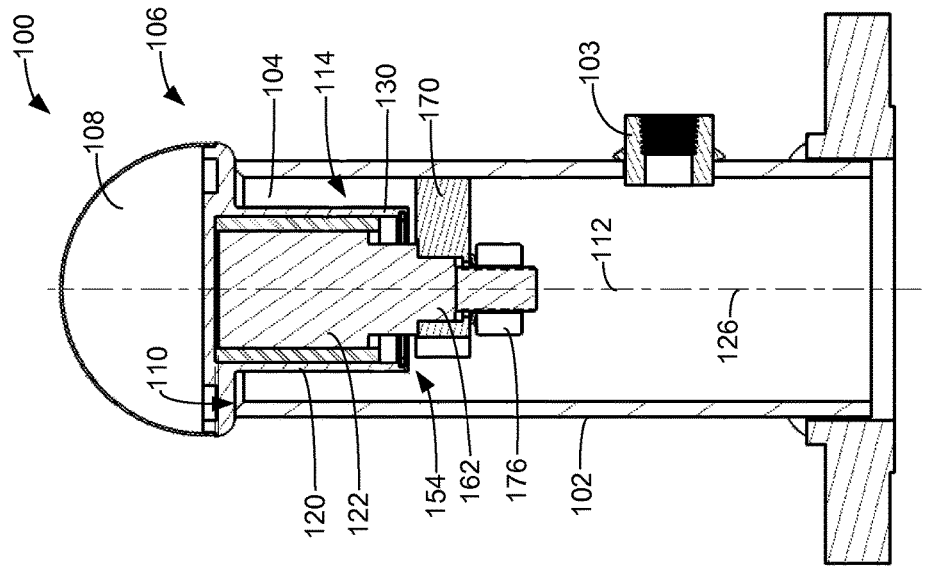
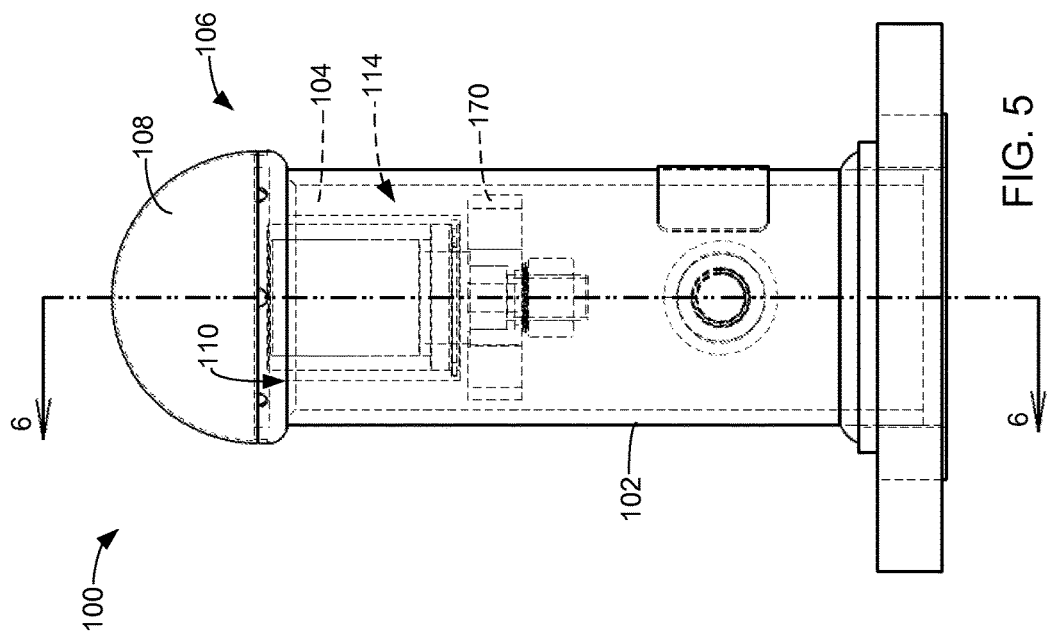

FLARE TIP VALVE DAMPENING

CROSS-REFERENCE TO RELATED APPLICATIONS

This application claims the benefit U.S. Provisional Application Ser. No. 62/031,209, filed Jul. 31, 2014 under 35 U.S.C. §119(e). The above-referenced application is incorporated herein by reference in its entirety.

BACKGROUND

There are many occasions in which waste gasses are disposed of using a flare stack burner. Such burners having conventionally utilized a flare tip comprising a valve body, such as a Coanda body, that is either free floating or spring-loaded against an outlet or valve seat of a gas pipe. Pressurized waste gas lifts the valve body off the valve seat to form a variable opening through which the waste gas is discharged and ignited by a pilot burner to dispose of the waste gas.

The exit velocity of the gas through the variable opening changes in response to the displacement of the valve body off the valve seat. This occurs due to the variable load applied to the valve body by the spring. As pressure increases, the valve body is displaced further from the valve seat.

The exit velocity of the gas past the spring-loaded flare tip increases as the square of the pressure. This can place significant volumetric gas flow limitations on spring-loaded flare tips due to exit velocity limitations (e.g., 400 ft/s) commanded by some environmental standards.

Additionally, at low pressures, conventional flare tips are known to produce "chatter." Chatter occurs when the gas produces enough pressure to lift the valve body off the valve seat, but not enough pressure to maintain the displacement of the valve body from the valve seat. Instead, the valve body repeatedly lifts off the valve seat and then drops back onto the valve seat in a rapid manner, causing undesirable chatter noise. Additionally, such chatter can potentially damage the valve seat.

SUMMARY

Some embodiments of the invention are directed to a combustible gas burner. In some embodiments, the combustible gas burner is in the form of a flare tip of a flare stacked burner having gas flow conduit including an outlet and a pressure relief valve.

In some embodiments, the pressure relief valve includes a valve seat at the outlet, a valve body, and an air dashpot damper. In some embodiments, the valve body is configured to engage the valve seat and move along a central axis relative to the valve seat in response to a pressure at the outlet to regulate a flow of combustible gas through the outlet. In some embodiments, the air dashpot damper includes a tubular member having a closed distal end and an open proximal end, and a piston member received within the tubular member. In some embodiments, the tubular member or the piston member is attached to the valve body, and the piston moves relative to the tubular member along an axis of the tubular member in response to movement of the valve body relative to the valve seat. In some embodiments, the pressure relief valve includes a plurality of the air dashpot dampers.

Some embodiments are directed to a method of regulating a flow of combustible gas through a flare tip of a flare stack burner. In some embodiments of the method, a valve body is moved along an axis relative to a valve seat located at an outlet of gas flow conduit of the flare tip in response to changes in pressure within the gas flow conduit at the outlet. Movement of the valve body relative to the valve seat is dampened using at least one air dashpot damper, each of which includes a piston and a tubular member. The piston moves relative to the tubular member in response to movement of the valve body.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 5 is a side view of an exemplary flare tip in accordance with embodiments of the invention.

FIG. 6 is a cross-sectional view of the flare tip of FIG. 5 taken generally along line 6-6.

DETAILED DESCRIPTION OF ILLUSTRATIVE EMBODIMENTS

Figure 1:
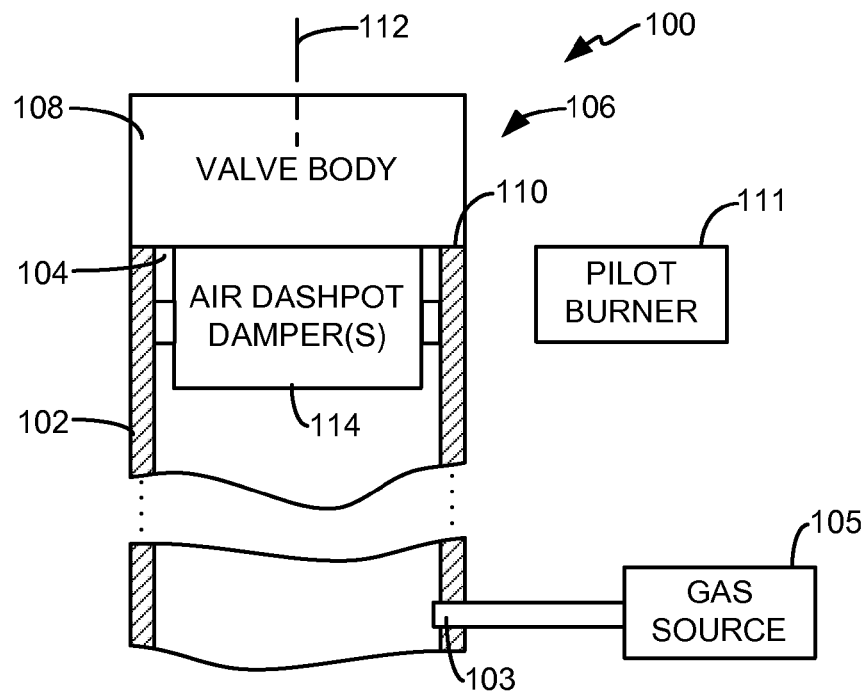
FIGS. 1 and 2 are simplified block diagrams of an exemplary flare tip respectively in closed and open modes, in accordance with embodiments of the invention.

Embodiments of the invention are described more fully hereinafter with reference to the accompanying drawings. Elements that are identified using the same or similar reference characters refer to the same or similar elements. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art.

Specific details are given in the following description to provide a thorough understanding of the embodiments. However, it is understood by those of ordinary skill in the art that the embodiments may be practiced without these specific details. For example, circuits, systems, networks, processes, frames, supports, connectors, motors, processors, and other components may not be shown, or shown in block diagram form in order to not obscure the embodiments in unnecessary detail.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention may also be described using flowchart illustrations and block diagrams. Although a flowchart may describe the operations as a sequential process, many of the operations can be performed in parallel or concurrently. In addition, the order of the operations may be re-arranged. A process is terminated when its operations are completed, but could have additional steps not included in a figure or described herein.

Figure 2:
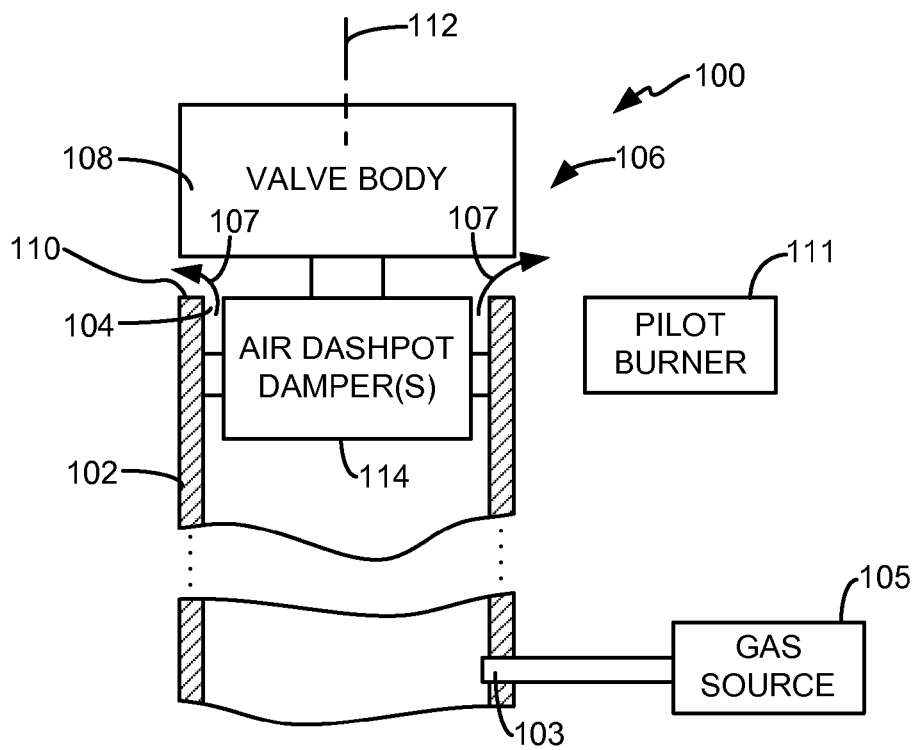

Some embodiments of the invention are directed to a combustible gas burner. In some embodiments, the combustible gas burner is in the form of a flare tip for use with a flare stack burner. FIGS. 1 and 2 are simplified block diagrams of an exemplary flare tip 100 respectively in closed and open modes, in accordance with embodiments of the invention.

In some embodiments, the flare tip 100 includes gas flow conduit or a housing 102 including an inlet 103, an outlet 104, and a pressure relief valve or gas flow regular (hereinafter "pressure relief valve") 106. The inlet 103 receives a flow of combustible gas from a gas source 105, such as waste gas. The pressure relief valve 106 is generally configured to provide a desired seal and a variable opening at the outlet 104 of the gas flow conduit 102 to regulate the flow of combustible gas 107 (FIG. 2) through the outlet 104.

In some embodiments, the pressure relief valve 106 includes a valve body 108 that engages a valve seat 110 at the outlet 104 when in a closed mode (FIG. 1), to form a desired seal at the valve seat 110 to prevent or at least restrict the flow of combustible gas through the outlet 104. In some embodiments, a small gap (e.g., 0.06 inches) may exist between the valve body 108 or portions of the valve body 108 and the valve seat 110 when the pressure relief valve 106 is in the closed position.

The valve body 108 is configured to move along an axis 112 relative to the gas flow conduit 102 and the valve seat 110 in response to pressurized gas within the conduit 102 or at the outlet 104, to place the pressure relief valve 106 in an open mode (FIG. 2), in which the valve body 108 is displaced from the valve seat 110. This forms an opening, such as an annular opening, between the valve body 108 and the valve seat 110 that varies in response to the pressure at the outlet 104. The gas flow 107 is discharged through the opening and is ignited by a pilot burner 111 (FIGS. 1 and 2) located in close proximity to the outlet 104.

In some embodiments, the pressure relief valve 106 comprises at least one air dashpot damper 114 that operates to dampen movement of the valve body 108 relative to the outlet 104 and the valve seat 110. In some embodiments, the one or more air dashpot dampers 114 do not rely upon gaskets, O-rings, or other fluid sealing components used in fluid-filled dashpot dampers. The air dashpot damper 114 dampens movement of the valve body 108 relative to the valve seat 110 by driving a flow of air and/or gas, such as the gas 107, through a restrictive airflow path, as discussed below in greater detail.

In some embodiments, the dampening provided by the one or more air dashpot dampers 114 prevents the valve body 108 from rapidly moving along the axis 112 in response to pressure changes in the gas flow at the outlet 104. When the valve body 108 is engaging or is in close proximity to the valve seat 110, the dampening of the movement of the valve body along the axis 112 provided by the one or more air dashpot dampers 114 eliminates or reduces chatter that would otherwise occur if a conventional spring-loaded flare tip were used.

For instance, when the pressure of the gas within the conduit 102 reaches a cracking pressure required to displace the valve body 108 off the valve seat 110, the valve body 108 moves along the axis 112 away from the valve seat 110, and the gas flow 107 is discharged through the opening that forms between the valve body 108 and the valve seat 110, as shown in FIG. 2. Fluctuations in the pressure of the gas flow accelerate movement of the valve body 108 along the axis 112 away from the valve seat 110 during a pressure increase, or toward the valve seat 110 during a pressure decrease. This acceleration of the valve body 108 along the axis 112 is dampened by the one or more air dashpot dampers 114 to prevent the valve body 108 from producing the undesired chatter against the valve seat 110 at gas flow pressures that are around the cracking pressure of the pressure relief valve 106.

Figure 3:
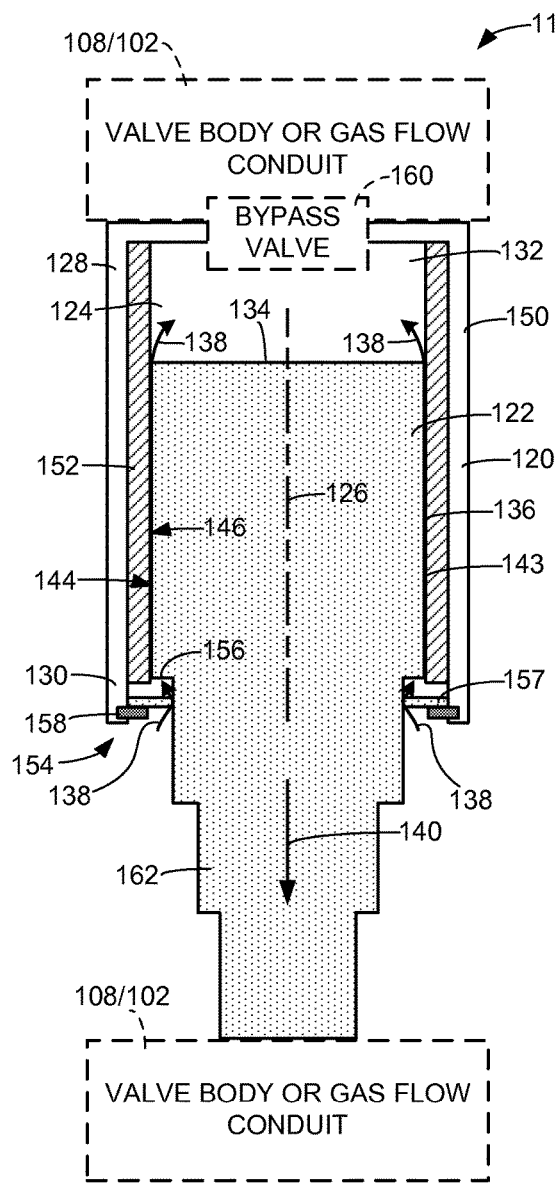
FIGS. 3 and 4 are simplified cross-sectional views of an exemplary air dashpot damper, in accordance with embodiments of the invention.
Figure 4:
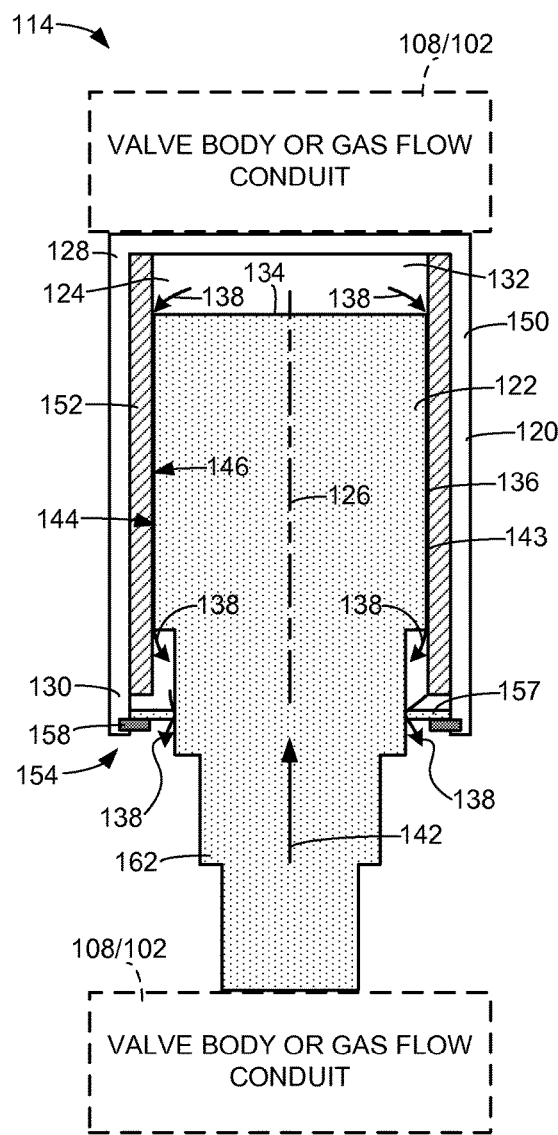
Figure 7:
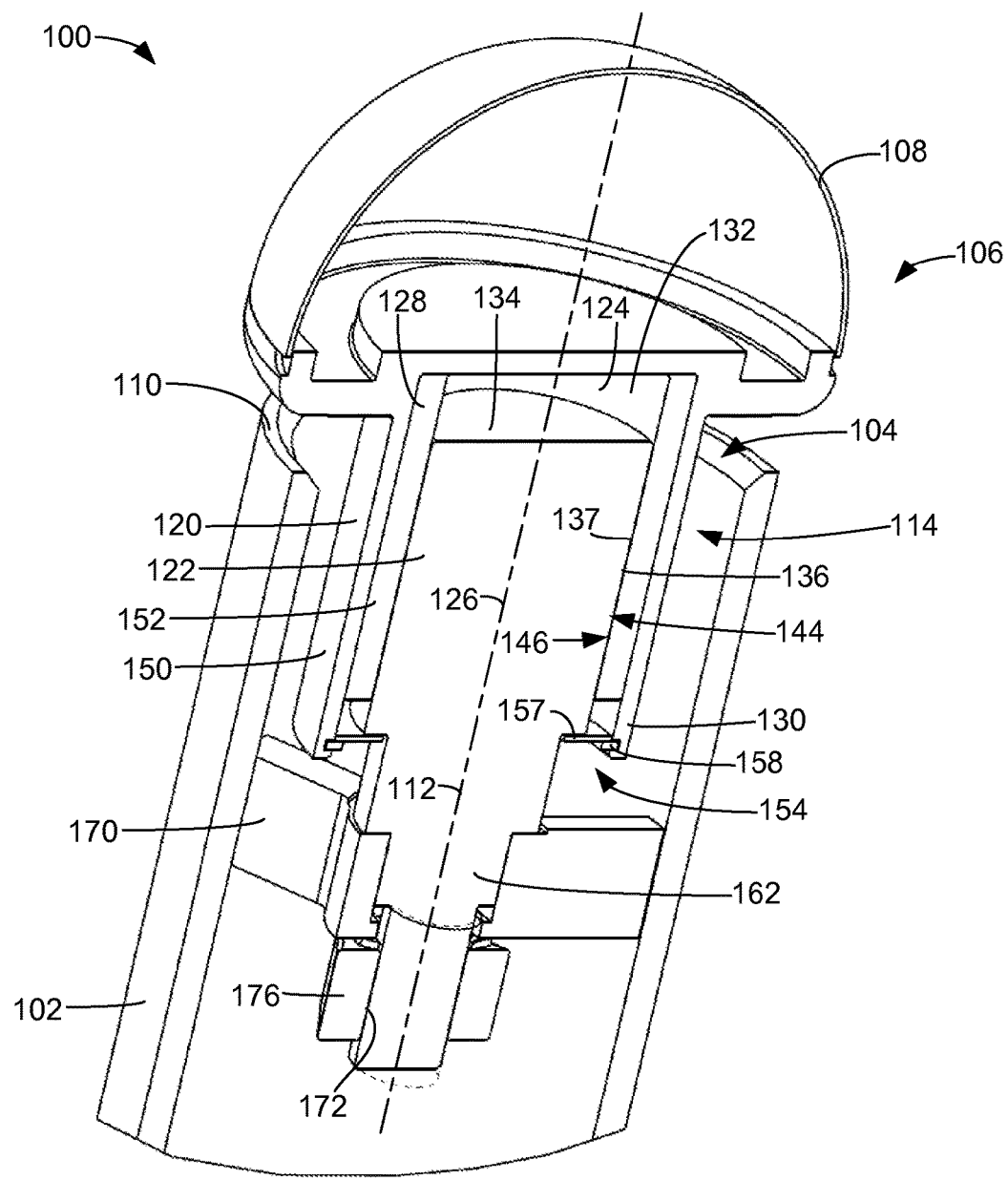
FIG. 7 is an isometric cross-sectional view of an exemplary flare tip in accordance with embodiments of the invention.
Figure 8:
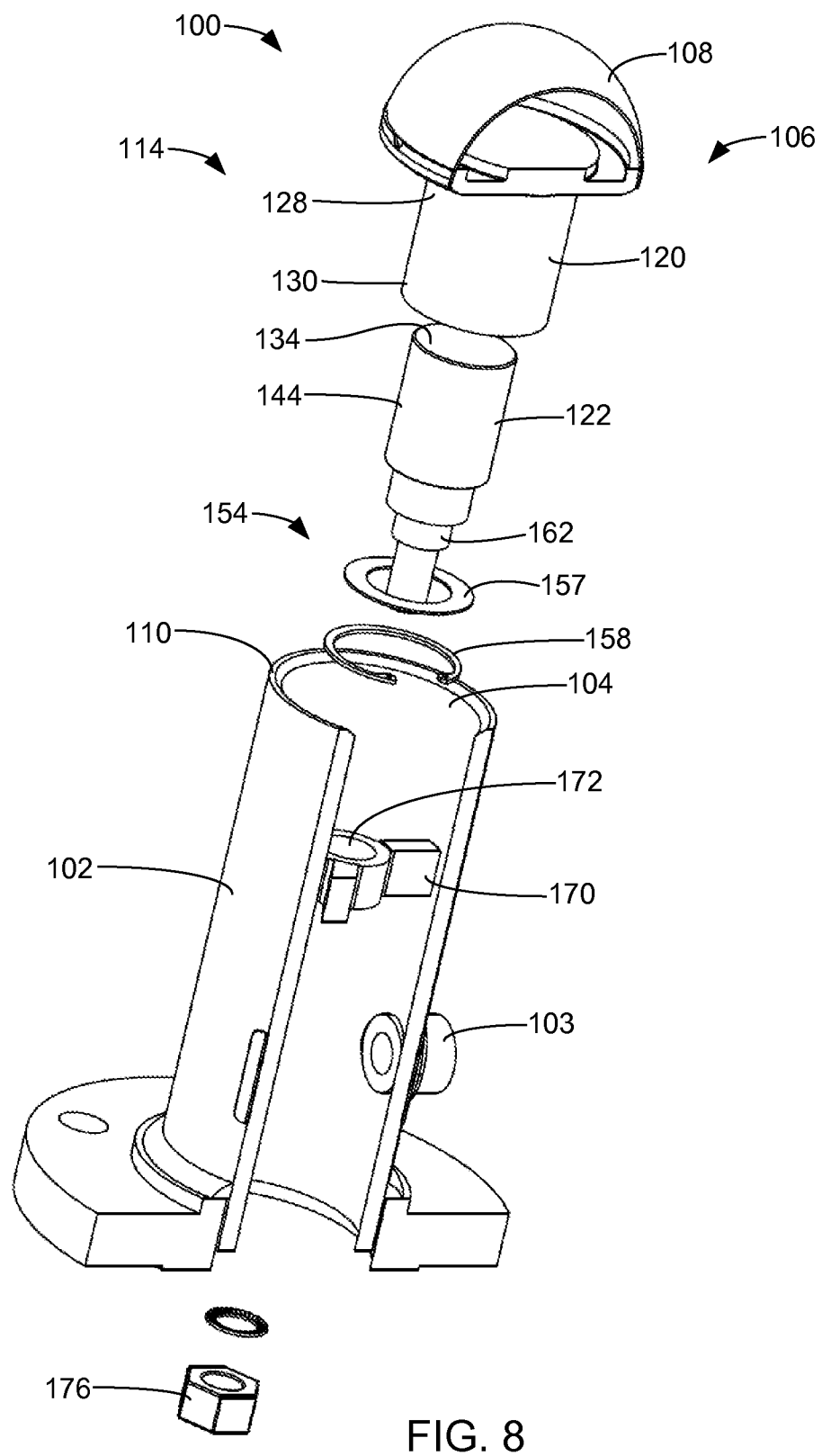
FIG. 8 is an isometric cross-sectional exploded view of an exemplary flare tip in accordance with embodiments of the invention.

FIGS. 3 and 4 are simplified cross-sectional views of an air dashpot damper 114 formed in accordance with one or more embodiments of the invention. Exemplary flare tips comprising at least one air dashpot damper 114 formed in accordance with one or more embodiments of the invention are shown in FIGS. 5-10. FIG. 5 is a side view of an exemplary flare tip 100 in accordance with embodiments of the invention. FIG. 6 is a cross sectional view of the flare tip 100 of FIG. 5 taken generally along line 6-6. FIG. 7 is an isometric cross-sectional view of a flare tip in accordance with embodiments of the invention. FIG. 8 is an isometric cross-sectional exploded view of an exemplary flare tip 100 in accordance with embodiments of the invention.

In some embodiments, the air dashpot damper 114 includes a tubular member 120 and a piston member 122. The piston member 122 is received within a bore 124 of the tubular member 120 and is configured to move along an axis 126 of the bore 124 relative to the tubular member 120 in response to movement of the valve body 108 relative to the valve seat 110.

Either the tubular member 120 or the piston member 122 is attached to the valve body 108, and the other of the tubular member 120 and the piston 122 has a fixed position relative to the valve seat 110, such as through attachment to the gas flow conduit 102, as shown in FIGS. 1, 2 and 5-10. The attachment of the tubular member 120 or the piston 122 to the valve body 108 may be through a direct connection with the valve body 108 or through an intermediary component. In some embodiments, the other of the tubular member 120 or piston 122 attaches to the conduit 102 through a support, as discussed below. While many of the examples of the air dashpot damper 114 provided herein illustrate the attachment of the tubular member 120 to the valve body 108, and the attachment of the piston 122 to the conduit 102, it is understood that this arrangement could be reversed. Furthermore, the component of the damper 114 that is attached to the conduit 102 could be attached to another component or the ground, in order to fix its position relative to the valve seat 110.

In some embodiments, the piston 122 moves relative to the tubular member 120 along the axis 126 in response to movement of the valve body 108 relative to the valve seat 110 or the outlet 104. In some embodiments, the tubular member 120 includes a distal end 128 and a proximal end 130. In some embodiments, the distal end 128 is sealed or substantially sealed to form a closed distal end 128. Here, the term "substantially sealed" is intended to cover the situation where some air flow may flow out of the closed distal end 128 due to small holes or minor imperfections in the sealing of the end 128 of the tubular member 120. In some embodiments, the proximal end 130 of the tubular member 120 includes an opening to the environment exterior to the tubular member 120, through which the piston 122 is inserted. As discussed in greater detail below, the open proximal end 130 of the tubular member 120 may be constricted in some embodiments.

In some embodiments, the airflow in the dashpot damper 114 seals or substantially seals a volume of air or gas that forms the airflow that is circulated through the damper 114. In some embodiments, the volume of air or gas is sealed by a bellows that covers the open proximal end 130 of the tubular member 120. This prevents or restricts contaminants within the gas flow 107 from entering the dashpot damper 114.

In some embodiments, the air dashpot damper 114 includes an interior chamber 132 that is defined by the piston 122, such as the top surface 134 of the piston 122 and the closed distal end 128 of the tubular member 120. In some embodiments, the air dashpot damper 114 includes a restrictive airflow path 136 that is formed between the interior chamber 132 and the open proximal end 130 of the tubular member 120.

In some embodiments, a pressure difference across the restrictive airflow path 136 changes in response to changes in the pressure at the outlet 104 that moves the valve body 108 relative to the valve seat 110 or outlet 104. Movement of the piston 122 relative to the tubular member 120 along the axis 126 in response to movement of the valve body 108 relative to the valve seat 110, drives an airflow 138 between the interior chamber 132 and the exterior of the tubular member 120, as shown in FIGS. 3 and 4. For instance, when the piston 122 moves in the direction of arrow 140 along the axis 126 relative to the tubular member 120, a vacuum forms in the chamber 132 and air/gas from outside the tubular member 120 or dashpot damper 114 is driven through an opening at the proximal end 130 of the tubular member 120 through the restrictive airflow path 136, and into the interior chamber 132, as shown in FIG. 3. That is, a pressure difference is formed between the exterior of the tubular member 120 or damper 114 (relatively high pressure) and the interior chamber 132 (relatively low pressure), which drives the airflow 138 through the airflow path 136 and into the interior chamber 132, as shown in FIG. 3.

When the piston 122 moves along the axis 126 relative to the tubular member 120 in the direction indicated by arrow 142 in FIG. 4, a pressure difference is formed between the interior chamber 132 (relatively high pressure) and the exterior to the tubular member 120 or damper 114 (relatively low pressure). This causes the airflow 138 to be driven from the interior chamber 132 through the airflow path 136 and to the exterior of the tubular member 120 or damper 114, as shown in FIG. 4.

The degree of restriction of the airflow path 136 to the airflow 138 between the interior chamber 132 and the exterior to the tubular member 120 or damper 114 determines the amount of dampening provided by the damper 114. In some embodiments, the airflow path 136 has an equivalent orifice size of 0.1-0.15 square inches. In some embodiments, the ratio of the area of bore 124 of the tubular member 120, which receives the piston 122, measured in a plane that is perpendicular to the axis 126 of the tubular member 120, to the area of the equivalent orifice of the airflow path 136 is in the range of 100:1-600:1. In general, the more massive the valve body 108 is, the greater the ratio between the area of the bore 124 to the equivalent area of the orifice of the airflow path 136.

In some embodiments, the airflow path 136 includes a gap 143 formed between an exterior wall 144 of the piston 122 and an interior wall 146 of the tubular member 120, as shown in FIGS. 3, 4 and 7. Embodiments of the air dashpot damper 114 do not include fluid sealing components found in fluid dashpot dampers, such as an O-ring or other fluid sealing member, within the gap 137 between the wall 144 of the piston 122 and the wall 146 of the tubular member 120. In one exemplary embodiment, the bore 124 of the tubular member 120 has a diameter of 1.605 inches and the piston 122 has a diameter of 1.600 inches. The resulting gap 137 between the exterior surface 144 of the piston 122 and the interior surface 146 of the tubular member 120 has a total area measured in a plane perpendicular to the axis 126 of 0.1266 inches. This results in a ratio of 161:1 for the area of the bore 124 to the equivalent orifice area of the gap. It is understood that other dimensions may be used for the bore 124 of the tubular member 120 and the diameter of the piston 122 to provide the desired relationship between the area of the bore 124 and the gap formed between the piston 122 and the tubular member 120.

In some embodiments, the tubular member 120 includes an outer cylindrical member 150 and an inner cylindrical member 152, as shown in FIGS. 3, 4, 7 and 8. In some embodiments, the inner cylindrical member 152 defines the interior wall 146 of the bore 124 of the tubular member 120, and provides a low-friction interface with the exterior wall 144 of the piston 122. In some embodiments, the inner cylindrical member 152 includes one or more high temperature bearing materials, such as graphite, ceramic and/or other high temperature bearing material. In some embodiments, the inner cylindrical member 152 is a graphite impregnated cast bushing. Such a member 152 handles temperature extremes and potentially corrosive materials that are commonly found in gas flows fed through flare stack burners. Other suitable materials can also be used to form the inner cylindrical member 152.

In some embodiments, the tubular member 120 includes a stop member 154 (FIGS. 3, 4, 7 and 8) that is positioned adjacent the proximal end 130 and having an inner diameter that is less than an inner diameter of the inner cylindrical member 152. In some embodiments, the restrictive airflow path 136 includes a gap between the stop member 154 and the piston 122 or a shaft 162 attached to the piston 122.

In some embodiments, the stop member 154 at the proximal end 130 of the tubular member 122 is configured to engage a shoulder 156 of the piston 122 to secure the piston 122 within the bore 124, and possibly place a limit on the distance the piston 122 can travel along the axis 126 in the direction 140 (FIG. 4). In some embodiments, the stop member 154 of the tubular member 120 comprises a washer 157 attached to the tubular member at the proximal end 130, such as within the bore of the outer cylindrical member 150, and a snap-ring 158 that is received within a recess of the outer cylindrical member 150, for example. As the piston 122 moves along the axis 126 in the direction 140, the shoulder 156 eventually engages the washer 157 thereby limiting further movement of the piston 122 in the direction 140 and maintaining the piston 122 within the tubular member 120. In some embodiments, the restrictive airflow path 136 also includes a gap between the interior diameter of the washer 157 and the exterior diameter of the piston 122 at the washer 157, as shown in FIGS. 3, 4 and 7.

In some embodiments, it may be desirable to provide less dampening of movement of the piston 122 relative to the tubular member 120 along the axis 126 in either of the direction 140 or the direction 142. For instance, it may be desirable to allow the valve body 108 to quickly move away from the valve seat 110 in response to an increase in pressure at the outlet 104 while dampening movement of the valve body 108 toward the valve seat 110 in response to a decrease in pressure at the outlet 104. In some embodiments, such a reduction to the dampening of movement of the piston 122 relative to the tubular member 120 is achieved using a bypass or check valve 160, which is schematically illustrated in FIG. 3. In some embodiments, the bypass valve 160 provides a low restriction airflow path between the exterior of the tubular member 120 and the interior chamber 132 relative to the airflow path 136. Essentially, the bypass valve 160 expands the corresponding orifice through which air is forced to travel between the exterior of the tubular member 120 and the interior chamber 132. In some exemplary embodiments, the bypass valve 160 may be in the form of an airflow passageway through the piston 122, or a wall of the tubular member 120.

In some embodiments, the bypass valve 160 opens when a pressure difference between the interior chamber 132 and the exterior to the tubular member 120 reaches a predetermined threshold. For instance, if the tubular member 120 is attached to the valve body 108, the formation of a vacuum within the interior chamber 132 relative to the exterior to the tubular member 120 is generated when the pressure at the outlet 104 drives the valve body 108 away from the valve seat 110 in the direction 140 (FIG. 3). This vacuum can cause the bypass valve 160 to open, thereby allowing air to flow more freely into the chamber 132 and the piston 122 to move with less resistance along the axis 126 in the direction 140 relative to the tubular member 120. This allows the valve body 108 to move more rapidly than if the bypass valve 160 was not present. This configuration would be reversed in the event that the piston 122 is connected to the valve body 108.

In some embodiments, a bushing support 170 is attached to the interior of the conduit 102 and is attached to either the piston 122 or the tubular member 120, depending on the configuration of the dashpot damper 114. For instance, the shaft 162 attached to the piston 122 may be received within a bore 172 of the bushing 170, as show in FIGS. 5-8. In some embodiments, an end 174 of the shaft 162 is threaded to receive a bolt 176 or other member to prevent or at least restrict movement of the shaft 162 and the piston 122 along the axis 126 relative to the bushing support 170.

In some embodiments, when a single dashpot damper 114 is used, the axis 126 and the axis 112 are coaxial. In some embodiments, the bore 172 of the bushing support 170 is coaxial to the axis 126. In some embodiments, the bore 172 of the bushing support 170 is coaxial to the axis 112.

Figure 10:
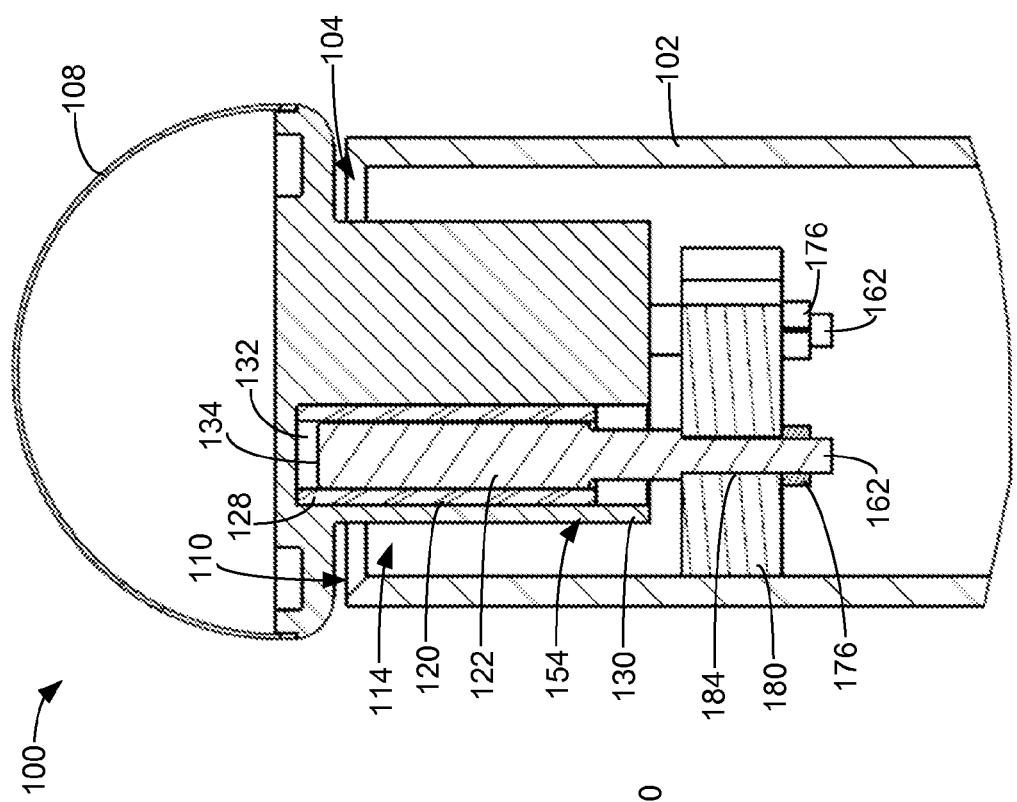
FIG. 10 is a side cross-sectional view of the flare tip of FIG. 9 taken generally along line 10-10.
Figure 9:
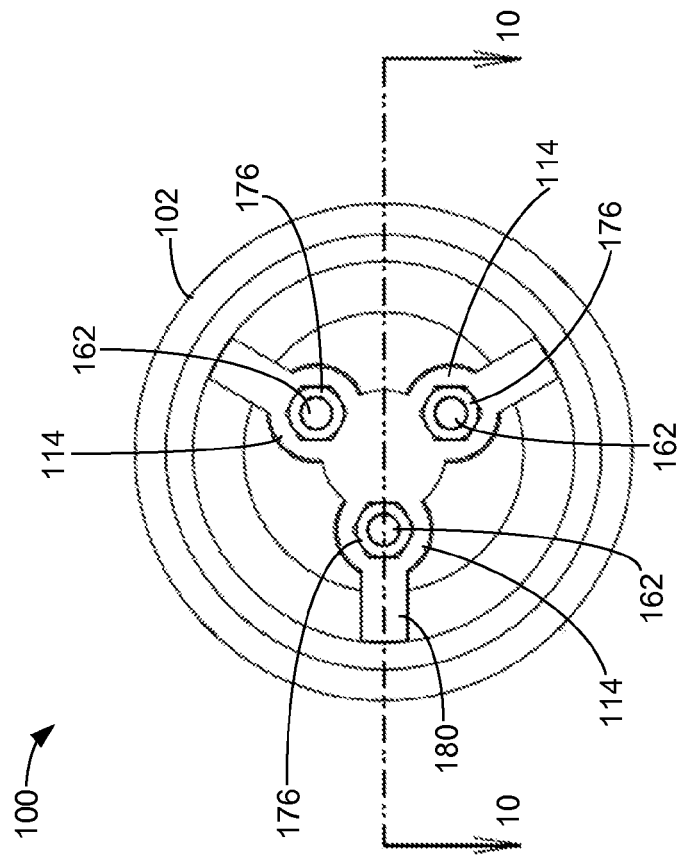
FIG. 9 is a bottom view of an exemplary flare tip having a plurality of air dashpot dampers in accordance with embodiments of the invention.

As mentioned above, some embodiments of the flare tip 100 include two or more air dashpot dampers 114, each of which is formed in accordance with one or more embodiments described herein. FIG. 9 is a bottom view of an exemplary flare tip 100 having a plurality of air dashpot dampers 114 in accordance with embodiments of the invention. FIG. 10 is a side cross-sectional view of the flare tip of FIG. 9 taken generally along line 10-10.

In some embodiments, the piston 122 or the tubular member 120 is attached to the valve body 108 (shown), and the other component has a generally fixed relation to the valve seat 110 or the outlet 104. In the exemplary embodiments of FIGS. 9 and 10, each of the dashpot dampers 114 are supported by a support member 180 that is attached to the conduit 102. In some embodiments, the support member 180 includes multiple bores 184 through which a portion of the shaft 162 of each air dashpot damper 114 extends, as shown in FIG. 9. The ends of the shafts 162 may be secured to the support member 180 using a bolt 176 or other suitable fastener.

In some embodiments, the one or more air dashpot dampers 114 are contained within the interior of the gas flow conduit 102 as shown in FIGS. 1, 2 and 5-10. In some embodiments, the one or more air dashpot dampers 114 are positioned relatively close to the outlet 104, as compared to fluid-filled dashpot dampers of the prior art. One reason for this is that the fluid dashpot damper of the prior art must be sufficiently displaced from the outlet to avoid the extreme temperatures near the outlet 104, which can damage the fluid dashpot damper. The placement of the one or more air dashpot dampers 114 in relatively close proximity to the outlet 104 simplifies the installation of the dampers 114 and allows for a reduction in the size of the flare tip 100, as compared to flare tips utilizing fluid or fluid-filled dashpot dampers. In some embodiments, the one or more air dashpot dampers 114 are located less than proximately 72 inches from the outlet 104, less than 24 inches from the outlet 104, less than 18 inches from the outlet 104, or less than 12 inches from the outlet 104.

Figure 11:
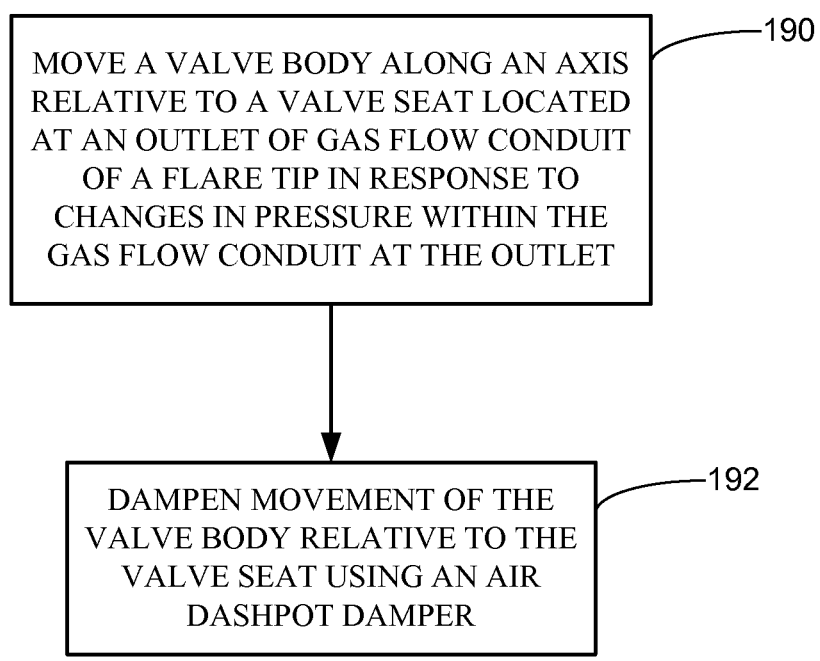
FIG. 11 is a flowchart illustrating a method of regulating a flow of combustible gas through a flare tip of a flare stack burner in accordance with embodiments of the invention.

Some embodiments of the invention are directed to a method of regulating a flow of combustible gas using a flare tip 100 formed in accordance with one or more embodiments described herein. FIG. 11 is a flowchart illustrating an exemplary method of regulating a flow of combustible gas through a flare tip 100 of a flare stack burner in accordance with embodiments of the invention.

At 190 of the method, a valve body 108 is moved along an axis 112 relative to a valve seat 110 located at an outlet 104 of gas flow conduit 102 of the flare tip 100 in response to changes in pressure within the gas flow conduit 102 at the outlet 104, as illustrated in FIGS. 1 and 2. This movement of the valve body 108 controls or regulates a gas flow 107 through the outlet 104. In some embodiments, the gas flow 107 discharged through the outlet 104 is ignited using a pilot burner 111.

At 192, movement of the valve body 108 relative to the valve seat 110 is dampened using at least one air dashpot damper 114 formed in accordance with one or more embodiments described herein. In some embodiments, each of the air dashpot dampers 114 includes a piston 122 and a tubular member 120, as shown in FIGS. 3 and 4. The piston 122 moves relative to the tubular member 120 responsive to moving the valve body 108 relative to the valve seat 110.

In some embodiments of step 192, an airflow is driven between an interior chamber 132, which is formed between the piston 122 and a closed distal end 128 of the tubular member 120, and an exterior of the air dashpot damper 114, through a restrictive airflow path 136. In some embodiments of step 192, a pressure difference across the airflow path 136 is generated. In some embodiments, the restrictive airflow path 136 includes a gap 137 between an exterior wall 144 of the piston 122 and an interior wall 146 of the tubular member.

Although the present invention has been described with reference to preferred embodiments, workers skilled in the art will recognize that changes may be made in form and detail without departing from the spirit and scope of the invention.

What is claimed is:

1. A flare tip comprising:
    gas flow conduit including an outlet; and
    a pressure relief valve comprising:
        a valve seat at the outlet;
        a valve body configured to engage the valve seat and move along a central axis relative to the valve seat in response to a pressure at the outlet to regulate a flow of combustible gas through the outlet; and
        an air dashpot damper comprising:
            a tubular member having a closed distal end and an open proximal end; and
            a piston member received within the tubular member
    wherein:
        one of the tubular member and the piston is attached to the valve body;
        the piston moves relative to the tubular member along an axis of the tubular member in response to movement of the valve body relative to the valve seat; and
        one of the piston and the tubular member is attached to the gas flow conduit and has a fixed position relative to the valve seat.

2. The flare tip according to claim 1, wherein the tubular member is attached to the valve body and moves along the central axis relative to the piston in response to movement of the valve body relative to the outlet.

3. The flare tip according to claim 1, wherein the piston is attached to the valve body and the piston moves relative to the tubular member responsive to movement of the valve body.

4. The flare tip according to claim 1, wherein an airflow is driven between an interior chamber defined by the piston and the closed distal end of the tubular member and the exterior of the air dashpot damper through a restrictive airflow path responsive to movement of the valve body along the central axis relative to the valve seat.

5. The flare tip according to claim 4, wherein the restrictive airflow path includes a gap between an exterior wall of the piston and an interior wall of the tubular member.

6. The flare tip according to claim 5, wherein:
    the tubular member includes an outer cylindrical member and an inner cylindrical member; and
    the airflow path includes a gap between the exterior wall of the piston and an interior wall of the inner cylindrical member.

7. The flare tip according to claim 6, wherein:
    the gap has a total area measured in a plane that is perpendicular to the axis of the tubular member of approximately 0.1-0.15 square inches; and/or
    the gap is an annular gap, and a ratio of the area of the bore of the tubular member measured in the plane, which is defined by the interior wall, to the area of the annular gap measured in the plane is within a range of 100:1-600:1.

8. The flare tip according to claim 6, wherein the inner cylindrical member comprises at least one of graphite and ceramic.

9. The flare tip according to claim 6, wherein:
    the tubular member includes a stop member adjacent the proximal end having an inner diameter that is less than an inner diameter of the inner cylindrical member;
    the restrictive airflow path includes a gap between the stop member and the piston or a shaft attached to the piston.

10. The flare tip according to claim 4, wherein a pressure difference across the restrictive airflow path changes in response to changes in the pressure at the outlet.

11. The flare tip according to claim 1, wherein a shaft is attached to the piston and the gas flow conduit and has a fixed position relative to the valve seat.

12. The flare tip according to claim 4, further comprising a bypass valve configured to provide a low restrictive airflow path from the exterior of the air dashpot damper to the interior chamber relative to the restrictive airflow path when the piston moves in a direction along the axis of the tubular member that expands the interior chamber.

13. The flare tip according to claim 1, further comprising a pilot burner configured to ignite combustible gas discharged between the valve body and the valve seat.

14. The flare tip according to claim 1, wherein the air dashpot damper is contained within the gas flow conduit.

15. A method of regulating a flow of combustible gas through a flare tip of a flare stack burner comprising:
    moving a valve body along an axis relative to a valve seat located at an outlet of gas flow conduit of the flare tip in response to changes in pressure within the gas flow conduit at the outlet;
    dampening movement of the valve body relative to the valve seat using an air dashpot damper, which includes a piston and a tubular member, responsive to moving the valve body comprising moving the piston relative to the tubular member responsive to moving the valve body; and
    igniting a flow of gas discharged between the valve body and the valve seat using a pilot burner.

16. The method according to claim 15, wherein dampening movement of the valve body comprises driving an airflow between an interior chamber formed between the piston and a closed distal end of the tubular member and an exterior of the air dashpot damper through a restrictive airflow path.

17. The method according to claim 16, wherein driving an airflow comprises driving an airflow through a gap between an exterior wall of the piston and an interior wall of the tubular member.

18. The method according to claim 15, wherein dampening movement of the valve body comprises dampening movement of the valve body a greater amount when the valve body moves toward the valve seat than when the valve body moves away from the valve seat.

\* \* \* \* \*